US012138930B2

(12) United States Patent
Sasaki et al.

(10) Patent No.: US 12,138,930 B2
(45) Date of Patent: Nov. 12, 2024

(54) LIQUID DISCHARGE APPARATUS

(71) Applicant: BROTHER KOGYO KABUSHIKI KAISHA, Nagoya (JP)

(72) Inventors: Zenichiro Sasaki, Nagoya (JP); Kenta Horade, Tokai (JP); Nobumasa Tanaka, Nagoya (JP); Ryuji Horata, Gamagori (JP); Takafumi Nakase, Nagoya (JP); Masahiro Hayashi, Nishio (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 126 days.

(21) Appl. No.: 17/938,757

(22) Filed: Oct. 7, 2022

(65) Prior Publication Data

US 2023/0166511 A1 Jun. 1, 2023

(30) Foreign Application Priority Data

Nov. 26, 2021 (JP) ................................ 2021-191829

(51) Int. Cl.
*B41J 2/165* (2006.01)
*B41J 2/045* (2006.01)

(52) U.S. Cl.
CPC ....... *B41J 2/16511* (2013.01); *B41J 2/04573* (2013.01)

(58) Field of Classification Search
CPC .......................... B41J 2/16511; B41J 2/04573
See application file for complete search history.

(56) References Cited

U.S. PATENT DOCUMENTS

2007/0139461 A1 6/2007 Izuo

FOREIGN PATENT DOCUMENTS

JP 2007-136858 A 6/2007
JP 2007-152889 A 6/2007
WO WO-2016152093 A1 * 9/2016 ........... B41J 2/0451

* cited by examiner

*Primary Examiner* — Sharon Polk
(74) *Attorney, Agent, or Firm* — Merchant & Gould P.C.

(57) ABSTRACT

There is provided a liquid discharge apparatus including: a liquid discharge head, a carriage, a carriage moving mechanism, a carriage motor, an output unit outputting a discharge determination signal, and a controller configured to carry out a determination of whether or not a liquid is discharged normally from the nozzle, based on the discharge determination signal outputted from the output unit when the liquid discharge head carries out an inspection driving. If a first condition is satisfied, then after a carriage drive in order to move the carriage to a predetermined position, the inspection driving is performed. If a second condition other than the first condition is satisfied, then the inspection driving is performed without performing the carriage drive.

11 Claims, 11 Drawing Sheets

FIG. 5B

| First Condition |
| --- |
| (A1) First carry out the discharge determination process after the printer is supplied with the power.<br>(A2) Carry out the discharge determination process right before the recording based on the user's recording command, or right after the recording, or during the recording.<br>(A3) Carry out the discharge determination process at a time included in a predetermined time period. |

FIG. 7A

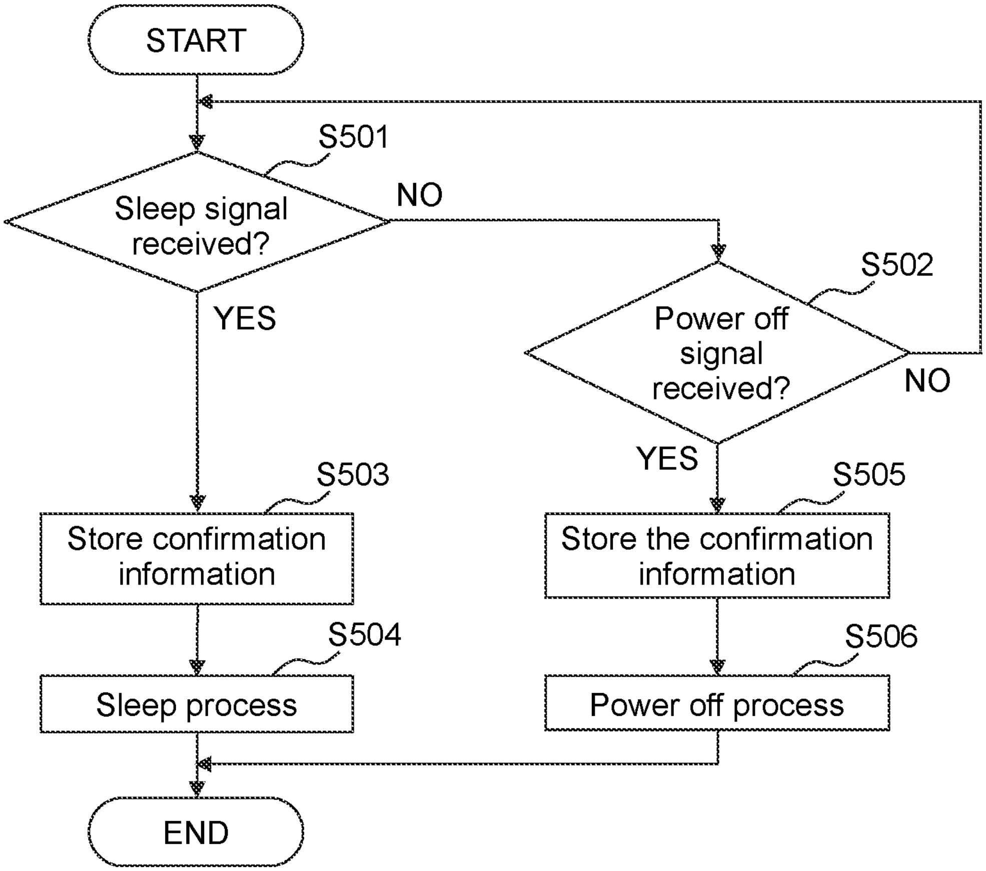

FIG. 7B

| Second Condition |
|---|
| (B1) The discharge determination process is carried out automatically after the recovery from the sleeping state or the switch to the power on state, and the confirmation information indicates the capped state.<br>(B2) Automatically carry out the discharge determination process at the designated time.<br>(B3) Carry out the discharge determination process at a time not included in a predetermined time period. |

FIG. 9

| First Condition |
| --- |
| (A1) First carry out the discharge determination process after the printer is supplied with the power.<br>(A2) Carry out the discharge determination process right before the recording based on the user's recording command, or right after the recording, or during the recording.<br>(A3) Carry out the discharge determination process at a time included in a predetermined time period.<br>(A4) The second discharge determination process is stopped. |

LIQUID DISCHARGE APPARATUS

REFERENCE TO RELATED APPLICATIONS

This application claims priority from Japanese Patent Application No. 2021-191829 filed on Nov. 26, 2021. The entire content of the priority application is incorporated herein by reference.

BACKGROUND ART

As an example of liquid discharge apparatuses discharging a liquid from nozzles, such ink jet printers are known as to carry out recording by way of discharging an ink from the nozzles. There is a publicly known ink jet printer is provided with an inspection area including an electrode member in a capping member covering the nozzles. Thereby, with a potential difference brought between the printing head and the inspection area, whether or not the ink is discharged normally from the nozzles is inspected on the basis of a change in the voltage of the inspection area when the printing head is caused to operate for discharging the ink toward the inspection area from the nozzles.

In this context, the publicly known ink jet printer has a carriage position detecting mechanism such has an encoder, an encoder sensor and the like. In this carriage position detecting mechanism, because the present correct position of the carriage is specified by an integrated value of the encoder's pulses from a specific position, if the encoder sensor is once turned off, then the encoder's pulses can no longer be acquired during the turnoff period, and therefore the present position of the carriage suffers degradation in reliability. Hence, in the above publicly known ink jet printer, when the printing head is caused to operate for discharging the ink toward the inspection area from the nozzles to inspect whether or not the ink is discharged normally from the nozzles, an operation is carried out every time for moving the printing head to a position where the nozzles face the inspection area.

However, in the case or the like where the user is not using the ink jet printer, if the printing head is caused to move to the position where the nozzles face the inspection area, then the user is liable to feel uncomfortable with a driving noise from the carriage.

DESCRIPTION

According to an aspect of the present disclosure, there is provided a liquid discharge apparatus including: a liquid discharge head, a carriage, a carriage motor, an output unit, and a controller. The liquid discharge head includes a nozzle. The carriage is configured to mount the liquid discharge head. The carriage moving mechanism is configured to move the carriage. The carriage motor is configured to drive the carriage moving mechanism. The output unit is configured to output a discharge determination signal according to whether or not a liquid is discharged normally from the nozzle by a inspection driving in a case that the inspection driving is performed for discharging the liquid from the nozzle, with the carriage in a predetermined position. The controller is configured to carry out a determination of whether or not the liquid is discharged normally from the nozzle based on the discharge determination signal output from the output unit in a case that the inspection driving is performed. In response that a first condition is satisfied, as a first discharge determination process, the controller causes the liquid discharge head to perform the inspection driving after causing the carriage moving mechanism to move the carriage to the predetermined position. In response that a second condition which is different from the first condition is satisfied, as a second determination process, the controller causes the liquid discharge head to perform the inspection driving, without causing the carriage moving mechanism to move the carriage to the predetermined position.

In a case that the first condition is satisfied, then the first discharge determination process is carried out to perform the inspection driving after the carriage drive is performed. In a case that the second condition is satisfied, then the second discharge determination process is carried out to perform the inspection driving without performing the carriage drive.

In the first discharge determination process, although the carriage drive is performed to move the carriage to the predetermined position such that the carriage drive causes a carriage motor to bring about driving noises, it is possible to reliably determine whether or not the liquid is discharged normally from the nozzle. On the other hand, in the second discharge determination process, because the inspection driving is performed without performing the carriage drive, the carriage motor does not bring about the driving noises.

Then, in a case that the second condition is set as a condition for a user to easily feel uncomfortable with the driving noises of the carriage motor, then by carrying out the second discharge determination process if the second condition is satisfied, it is possible to prevent the carriage motor from bringing about the driving noises due to the carriage drive under the condition for the user to easily feel uncomfortable. On the other hand, by carrying out the first discharge determination process if the first condition other than the second condition is satisfied, it is possible to reliably determine whether or not the liquid is discharged normally from the nozzle.

Note that right before the discharge determination process is carried out, such a case rarely happens that the carriage in the liquid discharge apparatus is not in the predetermined position. Therefore, even if the inspection driving is performed without performing the carriage drive, such a case still rarely happens that whether or not the ink is discharged normally from the nozzle cannot be determined.

FIG. 5B depicts a text for explaining a first condition.

FIG. 7A is a flow chart depicting a processing flow performed on returning from a sleeping state and on turning on the power.

FIG. 7B depicts a text for explaining a second condition.

FIG. 9 depicts a text for explaining another first condition for the example of stopping the second discharge determining process when the nozzles are not covered with the cap.

FIRST EMBODIMENT

<An Overall Configuration of a Printer>

Figure 1:
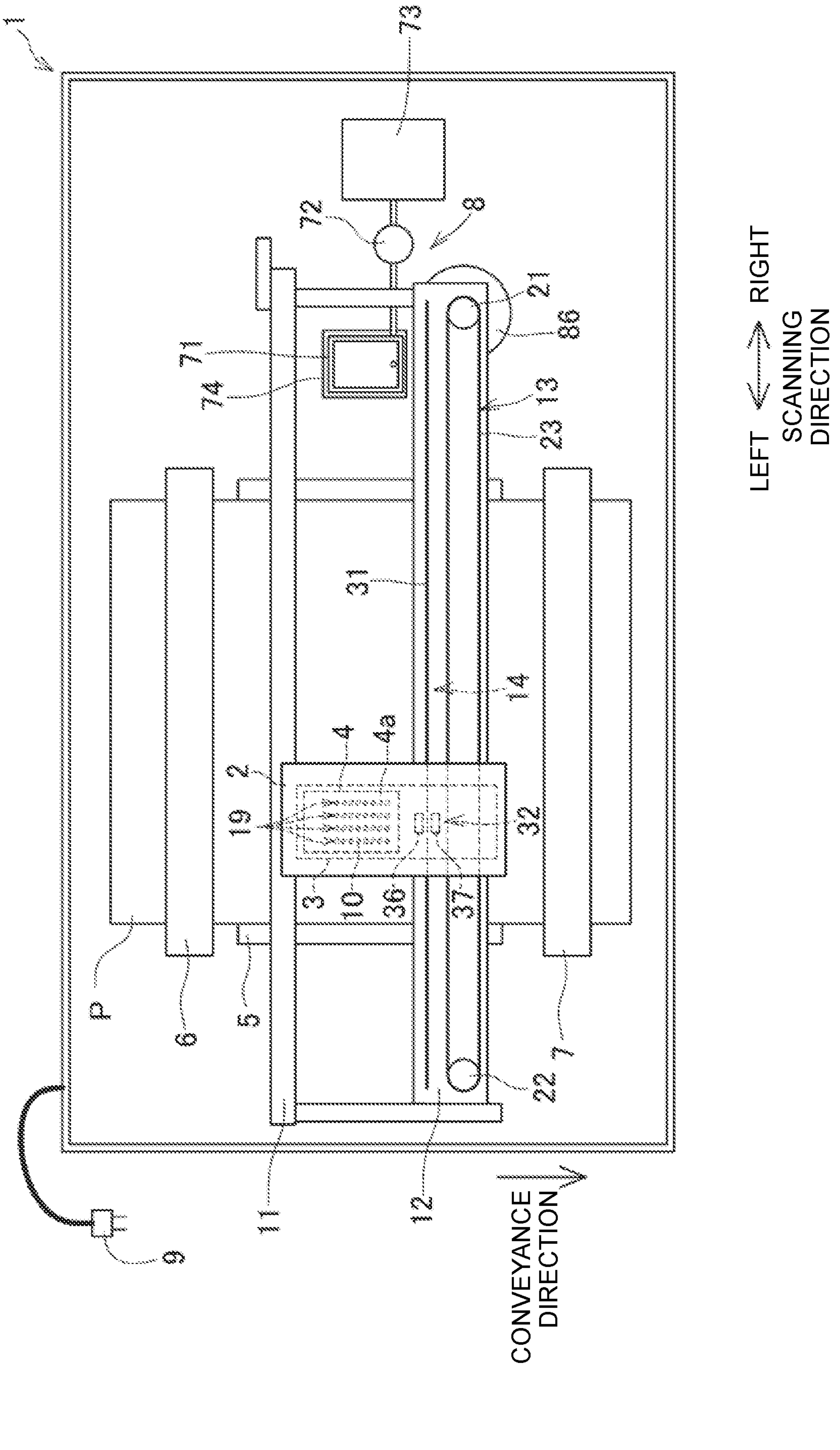
FIG. 1 is a schematic configuration diagram of a printer.

As depicted in FIG. 1, a printer 1 (an example of "liquid discharge apparatus" of the present disclosure) according to the first embodiment includes: a carriage 2, a sub tank 3, an ink jet head 4 (an example of "liquid discharge head" of the present disclosure), a platen 5, conveyance rollers 6 and 7, a maintenance unit 8, and a socket 9.

The carriage 2 is supported by two guide rails 11 and 12 extending in a scanning direction. Note that the following explanation will be made according to the definition of the right side and the left side in the scanning direction as depicted in FIG. 1. The carriage 2 is connected to a carriage moving mechanism 13. The carriage moving mechanism 13 has a driving pulley 21, a driven pulley 22, and a belt 23.

The driving pulley 21 is arranged at the right end of the guide rail 12. The driving pulley 21 is connected to a carriage motor 86 serving as the source of driving the carriage moving mechanism 13. The driven pulley 22 is arranged at the left end of the guide rail 12. The belt 23 is an endless belt stretched on and around the driving pulley 21 and the driven pulley 22. Further, the belt 23 has a part fixed on the carriage 2 between the driving pulley 21 and the driven pulley 22 in the scanning direction. Then, in the carriage moving mechanism 13, if the carriage motor 86 is driven, then the driving pulley 21 rotates to move the belt 23 in the scanning direction while the driven pulley 22 is in driven rotation. Then, because the belt 23 moves or operate in the scanning direction, the carriage 2 fixed on the belt 23 moves in the scanning direction along the two guide rails 11 and 12.

Further, the printer 1 includes a linear encoder 14 for acquiring information about the position of the carriage 2 in the scanning direction and the moving speed of the carriage 2. The linear encoder 14 has an encoder belt 31 and an encoder sensor 32.

The encoder belt 31 is arranged on the guide rail 12 to extend in the scanning direction through almost the entire length of the guide rail 12. The encoder belt 31 has a plurality of slits, not shown, aligning in the scanning direction.

The encoder sensor 32 is provided on the carriage 2. The encoder sensor 32 has a light emitting element 36 and a light receiving element 37. The light emitting element 36 is positioned on the upstream side of the encoder belt 31 in a conveyance direction orthogonal to the scanning direction. The light receiving element 37 is positioned on the downstream side of the encoder belt 31 in the conveyance direction. The light emitting element 36 and the light receiving element 37 face each other in the conveyance direction and the encoder belt 31 is arranged between the light emitting element 36 and the light receiving element 37.

The light emitting element 36 radiates light toward the light receiving element 37. When the light emitting element 36 and the light receiving element 37 face the slits of the encoder belt 31, the light radiated from the light emitting element 36 passes through the slits and the light receiving element 37 receives that light. When the light emitting element 36 and the light receiving element 37 face other parts of the encoder belt 31 than the slits, the light radiated from the light emitting element 36 is blocked by the encoder belt 31 and thus the light receiving element 37 does not receive the light.

Then, if the carriage 2 moves in the scanning direction, then these two states switch from one to the other alternately: the state of the light receiving element 37 receiving the light radiated from the light emitting element 36 and the state of the light receiving element 37 not receiving the light radiated from the light emitting element 36. By virtue of this, if the carriage 2 is moved from an aftermentioned maintenance position in the scanning direction, for example, then based on the number of switches between the above two states (the number of the slits which have been passed over), it is possible to acquire the information of the position of the carriage 2 in the scanning direction. Further, based on the time interval of the switch between the above two states, it is possible to acquire the information of the moving speed of the carriage 2.

Note that it is possible to reverse the abovementioned positional relation between the light emitting element 36 and the light receiving element 37 in the encoder sensor 32. Further, in the first embodiment, the encoder belt 31 is arranged between the light emitting element 36 and the light receiving element 37 in the conveyance direction, that is, it is a so-called transmission type encoder sensor. However, without being limited to that, the encoder sensor may be of a so-called reflection type where the light emitting element and the light receiving element are positioned on the same side in the conveyance direction with respect to the encoder belt. In such a case, if the carriage 2 moves in the scanning direction, then these two states switch from one to the other alternately: the state of the light receiving element receiving the light radiated from the light emitting element and reflected from the encoder belt, and the state of the light receiving element not receiving the light being radiated from the light emitting element and transmitting through the encoder belt.

The sub tank 3 is mounted on the carriage 2. The sub tank 3 is connected with four unshown ink cartridges via unshown tubes. The four ink cartridges retain an ink (the "liquid" of the present disclosure) of these four colors: black, yellow, cyan and magenta, respectively. The ink of the above four colors is supplied from the four ink cartridges to the sub tank 3.

The ink jet head 4 is mounted on the carriage 2 and connected to the lower end of the sub tank 3. The ink jet head 4 is supplied with the ink of the abovementioned four colors from the sub tank 3. Further, the ink jet head 4 discharges the ink from a plurality of nozzles 10 formed in a nozzle surface **4*a* which is the lower surface thereof. To explain this in more detail, the plurality of nozzles 10 is arrayed in the conveyance direction to form four nozzle arrays 19. In the nozzle surface 4*a*, the four nozzle arrays 19 align in the scanning direction. From the plurality of nozzles 10, the ink of black, yellow, cyan and the magenta is discharged in order according to those forming the nozzle arrays 19** from the right side in the scanning direction.

The platen 5 is arranged below the ink jet head 4 to face the plurality of nozzles 10. The platen 5 extends in the scanning direction through the entire length of recording paper P to support the recording paper P from below. The conveyance roller 6 is arranged on the upstream side of the ink jet head 4 and the platen 5 in the conveyance direction. The conveyance roller 7 is arranged on the downstream side of the ink jet head 4 and the platen 5 in the conveyance direction. The conveyance rollers 6 and 7 are connected to a conveyance motor 87 (see FIG. 4) via unshown gears and the like. If the conveyance motor 87 is driven, then the conveyance rollers 6 and 7 rotate to convey the recording paper P in the conveyance direction.

The maintenance unit 8 includes a cap 71, a suction pump 72, and a waste tank 73. The cap 71 is arranged on the right side of the platen 5 in the scanning direction. Then, if the carriage 2 is moved into the maintenance position (the "predetermined position" of the present disclosure) on the right side of the platen 5 in the scanning direction, then the plurality of nozzles 10 comes to face the cap 71.

Further, the cap 71 is connected to a cap ascending/descending mechanism 74 (the "cap moving mechanism" of the present disclosure). The cap ascending/descending mechanism 74 is connected to a cap motor 88 (see FIG. 4). If the cap motor 88 is driven, then the cap ascending/descending mechanism 74 causes the cap 71 to ascend or descend between a capping position for covering the nozzles 10, and an uncapping position below the capping position away from the ink jet head 4. Then, with the carriage 2 being in the aforementioned maintenance position to let the plurality of nozzles 10 face the cap 71, if the cap ascending/descending mechanism 74 causes the cap 71 to ascend up to the capping position, then an upper end part of the cap 71 comes to attach tightly to the nozzle surface 4*a* such that the plurality of nozzles 10 is put into a capped state being covered by the cap 71. With the cap 71 in the uncapping position, the plurality of nozzles 10 is not covered by the cap 71. Note that the cap 71 is not limited to covering the plurality of nozzles 10 by way of attaching tightly to the nozzle surface 4*a*. The cap 71 may cover the plurality of nozzles 10 by way of attaching tightly to an unshown frame or the like, for example, arranged in the surrounding of the nozzle surface 4*a* of the ink jet head 4.

The suction pump 72 is a tube pump and connected to the cap 71 and to the waste tank 73. Then, in the maintenance unit 8, if the suction pump 72 is driven with the cap 71 in the above state, then it is possible to carry out a so-called suction purge, that is, the ink in the ink jet head 4 is discharged from the plurality of nozzles 10. The ink discharged by the suction purge is retained in the waste tank 73.

Note that in this context, for the sake of convenience, the above explanation was made with the case where the cap 71 collectively covers all nozzles 10 and the ink in the ink jet head 4 is discharged from all nozzles 10 in the suction purge. However, without being limited to that, for example, the cap 71 may include two different parts: the part covering the plurality of nozzles 10 forming the rightmost nozzle array 19 to discharge the black ink, and the part covering the plurality of nozzles 10 forming the left three nozzle arrays 19 to discharge the color ink (the ink of yellow, cyan, and magenta). Then, it is possible to selectively discharge the black ink and any of the color ink in the ink jet head 4 in the suction purge. Alternatively, for example, the cap 71 may be provided individually for each nozzle array 19 and, in the suction purge, the ink can be discharged from the nozzles 10 individually according to each nozzle array 19.

Figure 2:
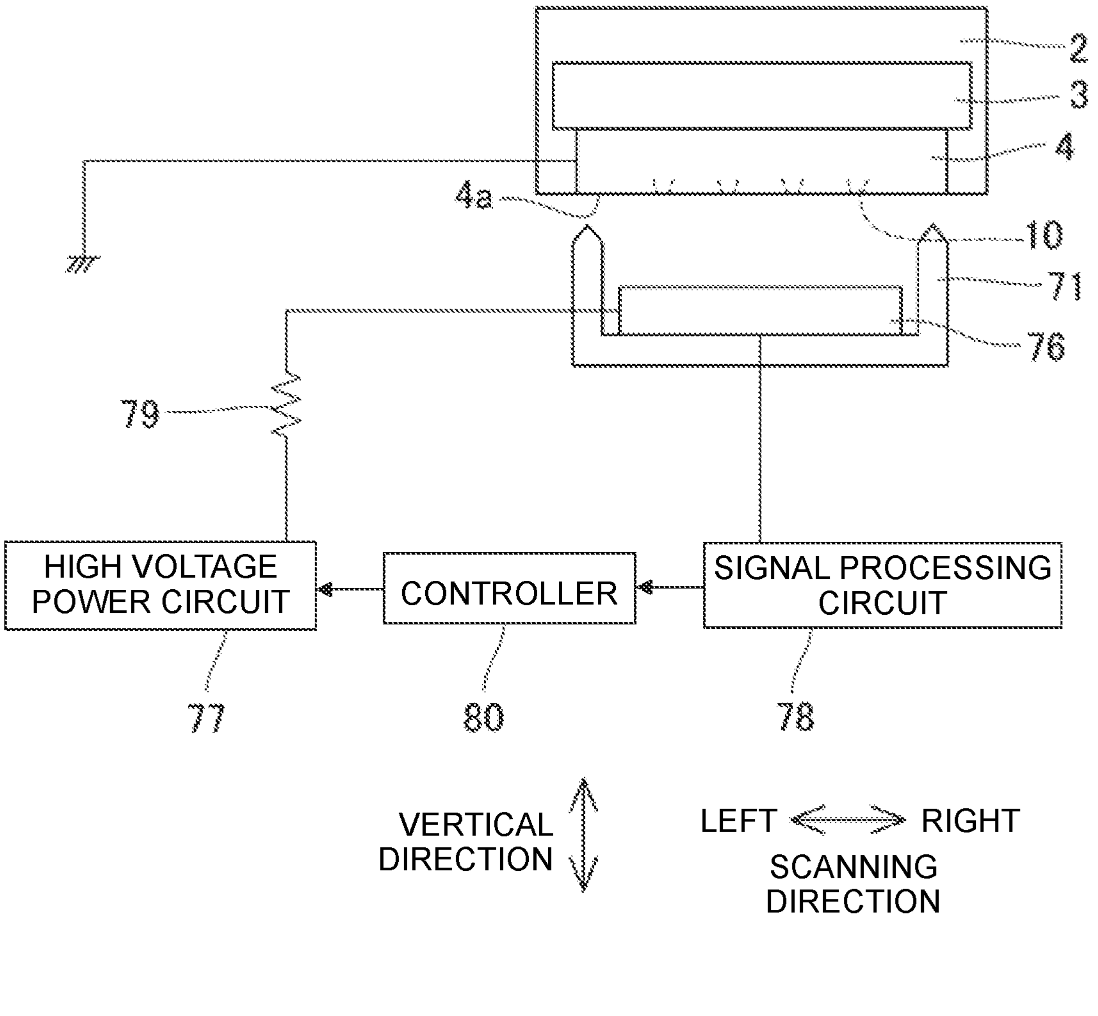
FIG. 2 is a diagram for explaining an electrode arranged in a cap, and a connecting relation between the electrode, and a high voltage power circuit and a signal processing circuit.

Further, as depicted in FIG. 2, an electrode 76 having a rectangular planer shape is arranged inside the cap 71. The electrode 76 is connected to a high voltage power circuit 77 (the "voltage supplier" of the present disclosure) via a resistor 79. Then, if the high voltage power circuit 77 applies a predetermined voltage (600V or so for example) to the electrode 76 when an aftermentioned inspection driving is performed. On the other hand, the ink jet head 4 is kept at the grounding potential. By virtue of this, a predetermined potential difference arises between the ink jet head 4 and the electrode 76. A signal processing circuit 78 is connected to the electrode 76. The signal processing circuit 78 includes a differential circuit and the like to output a discharge determination signal according to the voltage of the electrode 76. However, the signal outputted from the signal processing circuit 78 may be in the form of electric current. Note that in the first embodiment, the combination of the electrode 76, the high voltage power circuit 77, the signal processing circuit 78, and the resistor 79 corresponds to the "discharge determination signal output unit" of the present disclosure.

In this context, in the first embodiment, it is configured to apply the predetermined voltage to the electrode 76, keep the ink jet head 4 at the grounding potential, and let signal processing circuit 78 output the signal according to the voltage of the electrode 76. However, without being limited to that, it may be configured to keep the electrode 76 at the grounding potential and apply the predetermined voltage to the ink jet head 4 so as to give rise to a potential difference between the electrode 76 and the ink jet head 4, while the signal processing circuit 78 is connected to the ink jet head 4 to output the discharge determination signal according to the voltage of the ink jet head 4.

Figure 3A:
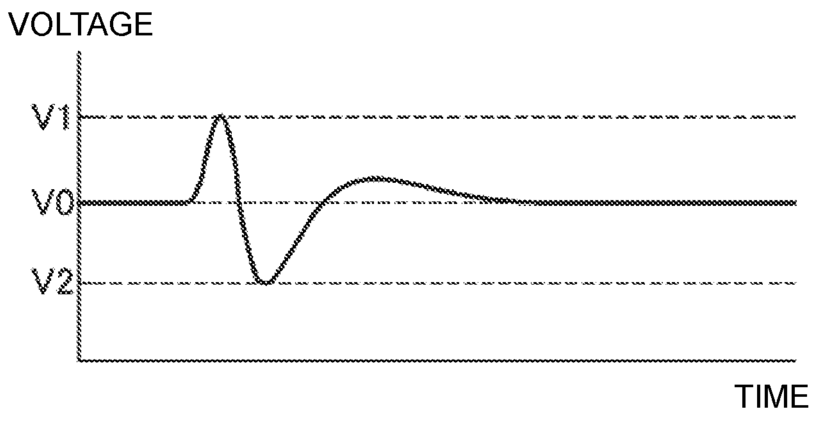
FIG. 3A is a graph depicting a signal outputted from the signal processing circuit when an ink is discharged from nozzles by an inspection driving.
Figure 3B:
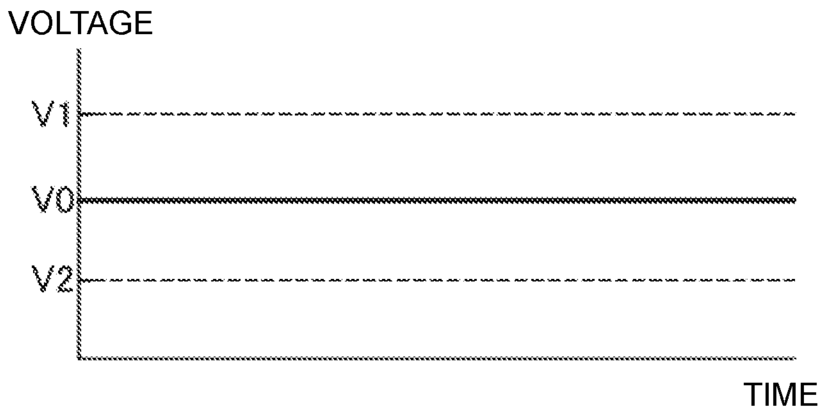
FIG. 3B is a graph depicting a signal outputted from the signal processing circuit when no ink is discharged from the nozzles by the inspection driving.

In the aforementioned capped state, if the high voltage power circuit 77 applies the voltage to the electrode 76 and the aftermentioned inspection driving is not performed, then the voltage of the signal outputted from the signal processing circuit 78 is the voltage V0 depicted in FIGS. 3A and 3B.

Further, in the first embodiment, in the aforementioned capped state, provided that the high voltage power circuit 77 applies the voltage to the electrode 76, it is possible to perform the inspection driving to drive the ink jet head 4 for discharging the ink from the nozzles 10 toward the electrode 76.

If the ink is discharged from the nozzles 10 due to the inspection driving, then the ink discharged from the nozzles 10 is charged or electrified. By virtue of this, when the charged ink is approaching the electrode 76, the potential of the electrode 76 changes until the ink lands on the electrode 76. Then, after the charged ink lands on the electrode 76, the potential of the electrode 76 attenuates and returns, at the same time, to the potential before the ink is discharged.

On this occasion, as depicted in FIG. 3A, the voltage of the signal outputted from the signal processing circuit 78 increases from the voltage V0 to a voltage V1 higher than the voltage V0, and then decreases to a voltage V2 lower than the voltage V0. Thereafter, the voltage repetitively increases and decreases in attenuating until returning to the voltage V0. By virtue of this, the signal outputted from the signal processing circuit 78 has the voltage V1 as the maximum value and the voltage V2 as the minimum value.

On the other hand, if the ink is not discharged from the nozzles 10 in the inspection driving, then the signal outputted from the signal processing circuit 78 almost has no change from the voltage V0, as depicted in FIG. 3B.

In this manner, in the first embodiment, depending on whether or not the ink is discharged from the nozzles 10 due to the inspection driving, the signal outputted from the nozzles 10 differs. Then, in the first embodiment, this feature is used to determine whether or not the ink is discharged normally from the nozzles 10.

For example, if the difference between the maximum value and the minimum value of the signal outputted from the signal processing circuit 78 is equal to or larger than a threshold value, then it is determined that the ink is discharged normally from the nozzles 10, whereas if the difference between the maximum value and the minimum value is smaller than the threshold value, then it is determined that the ink is not discharged normally from the nozzles 10. On this occasion, the above maximum value is reached during a part of period for determining a predetermined length with the start point at the timing of having performed the inspection driving, the part of period including the timing of estimating the maximum value of the signal outputted from the signal processing circuit 78 when the ink is discharged from the nozzles 10 due to the inspection driving. Alternatively, the above maximum value may serve as the maximum value through the entire determination period. Further, the above minimum value is reached during a part of the above determination period, the part of period including the timing of estimating the minimum value of the signal outputted from the signal processing circuit 78 when the ink is discharged from the nozzles 10 due to the inspection driving. Alternatively, the above minimum value may serve as the minimum value through the entire determination period.

Further, in the first embodiment, based on whether or not the difference between the maximum value and the minimum value of the signal outputted from the signal processing circuit 78 is equal to or larger than the threshold value, whether or not the ink is discharged normally from the nozzles 10 is determined. However, without being limited to that, for example, based on another standard such as whether or not the above maximum value is equal to or larger than a threshold value, whether or not the above minimum value is equal to or smaller than a threshold value, or the like, it is possible to determine whether or not the ink is discharged normally from the nozzles 10.

The socket 9 can be connected to an unshown AC power source. Then, with the socket 9 being plugged in and connected to the AC power source, the printer 1 is supplied with an electric power. If the plug is pulled out of the socket 9, then the printer 1 is not supplied with the electric power.

<An Electric Configuration of the Printer>

Figure 4:
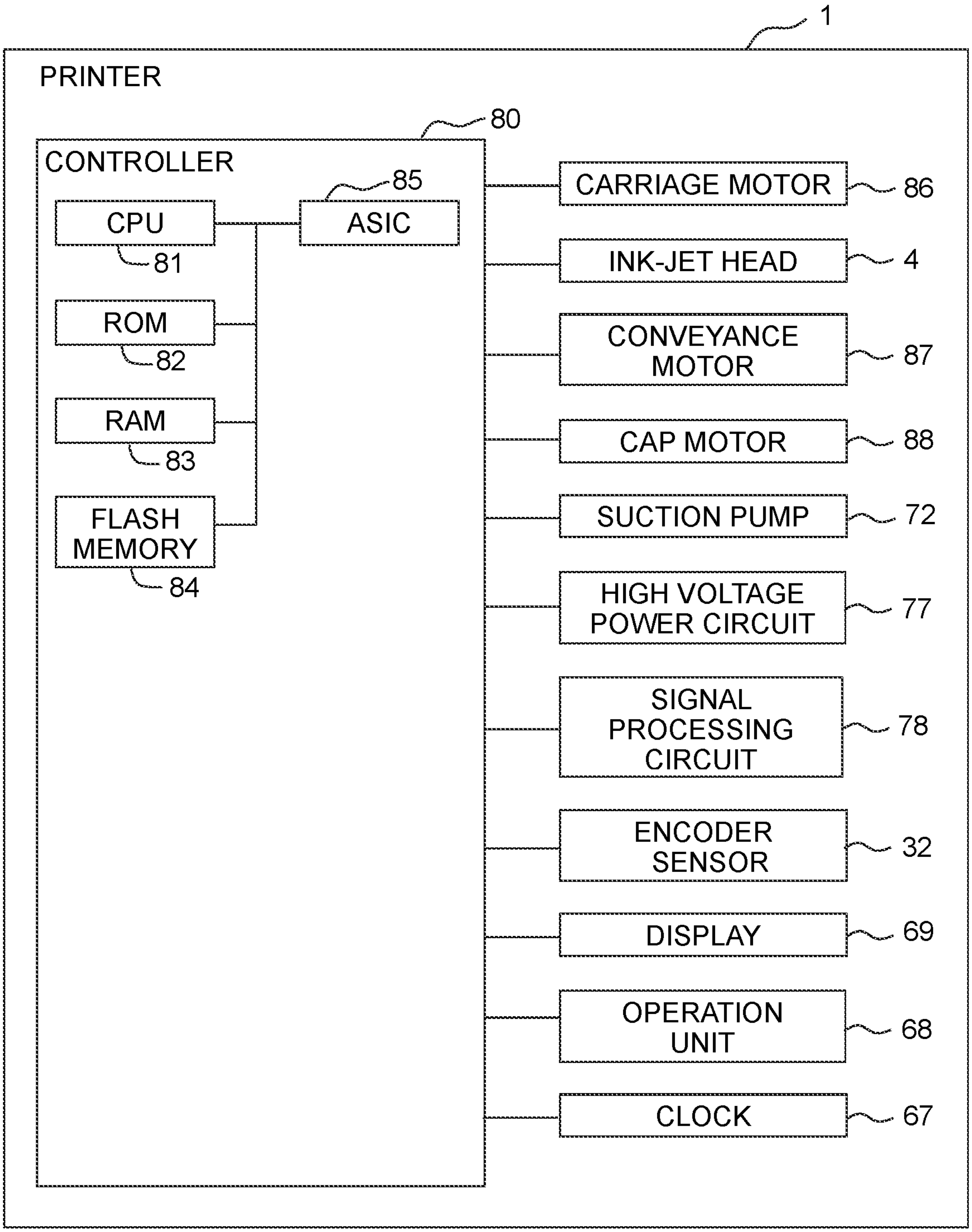
FIG. 4 is a block diagram depicting an electric configuration of the printer.

Next, an electric configuration of the printer 1 will be explained. As depicted in FIG. 4, the printer 1 includes a controller 80. The controller 80 is constructed from a CPU (Central Processing Unit) 81, a ROM (Read Only Memory) 82, a RAM (Random Access Memory) 83, a flash memory 84 (the "storage unit" of the present disclosure), an ASIC (Application Specific Integrated Circuit) 85, and the like. The controller 80 controls the operations of the carriage motor 86, the ink jet head 4, the conveyance motor 87, the cap motor 88, the suction pump 72, the high voltage power circuit 77, and the like. Further, the controller 80 receives the signals from the encoder sensor 32 and the signal processing circuit 78.

Further, other than the constituents explained above, the printer 1 includes a display 69 and an operation unit 68 (the "signal receiver" of the present disclosure), and a clock 67. The display 69 is, for example, a liquid crystal display or the like provided on the casing of the printer 1. The controller 80 controls the display 69 to display necessary information on the display 69. The operation unit 68 is buttons provided on the casing of the printer 1, a touch panel provided on the display 69, and the like. The operation unit 68 receives a signal according to a user's operation and sends the received signal to the controller 80. The clock 67 sends a signal showing the present time to the controller 80.

Note that the controller 80 may either let the CPU 81 alone carry out various processes or let the ASIC 85 alone carry out the various processes or let the CPU 81 and the ASIC 85 cooperate to carry out the various processes. Further, the controller 80 may either let a single CPU 81 carry out the processes or let a plurality of CPUs 81 share the processes to carry out. Further, the controller 80 may either let a single ASIC 85 carry out the processes or let a plurality of ASICs 85 share the processes to carry out.

<Process in Recording>

Next, an explanation will be made on a process by the controller 80 when the printer 1 carries out recording on the recording paper P. In the first embodiment, for example, when a user operates on the operation unit 68 to request for carrying out recording on the recording paper P, a recording command will be sent from the operation unit 68 to the controller 80 to request for carrying out the recording. The controller 80 will then receive this recording command.

In this manner, if the recording command is received, then the controller 80 controls the conveyance motor 87 and an unshown paper feeding device to supply the recording paper P. Next, the controller 80 carries out the recording on the recording paper P by repetitively carrying out: 1) a recording path for the ink jet head 4 to discharge the ink onto the recording paper P from the plurality of nozzles 10 while driving the carriage motor 86 for the carriage moving mechanism 13 to move the carriage 2 in the scanning direction, and 2) a conveying operation to drive the conveyance motor 87 for the conveyance rollers 6 and 7 to convey the recording paper P in the conveyance direction through a predetermined distance. After the recording on the recording paper P is finished, the controller 80 drives the conveyance motor 87 for the conveyance rollers 6 and 7 to discharge the recording paper P finished with the recording.

<Process in Discharge Determination>

Next, an explanation will be made on a process by the controller 80 when determining whether or not the ink is discharged normally from the nozzles 10. In the first embodiment, following the flow of FIG. 5A to carry out the process, a discharge determination process is carried out for determining whether or not the ink is discharged normally from the nozzles 10.

Figure 5A:
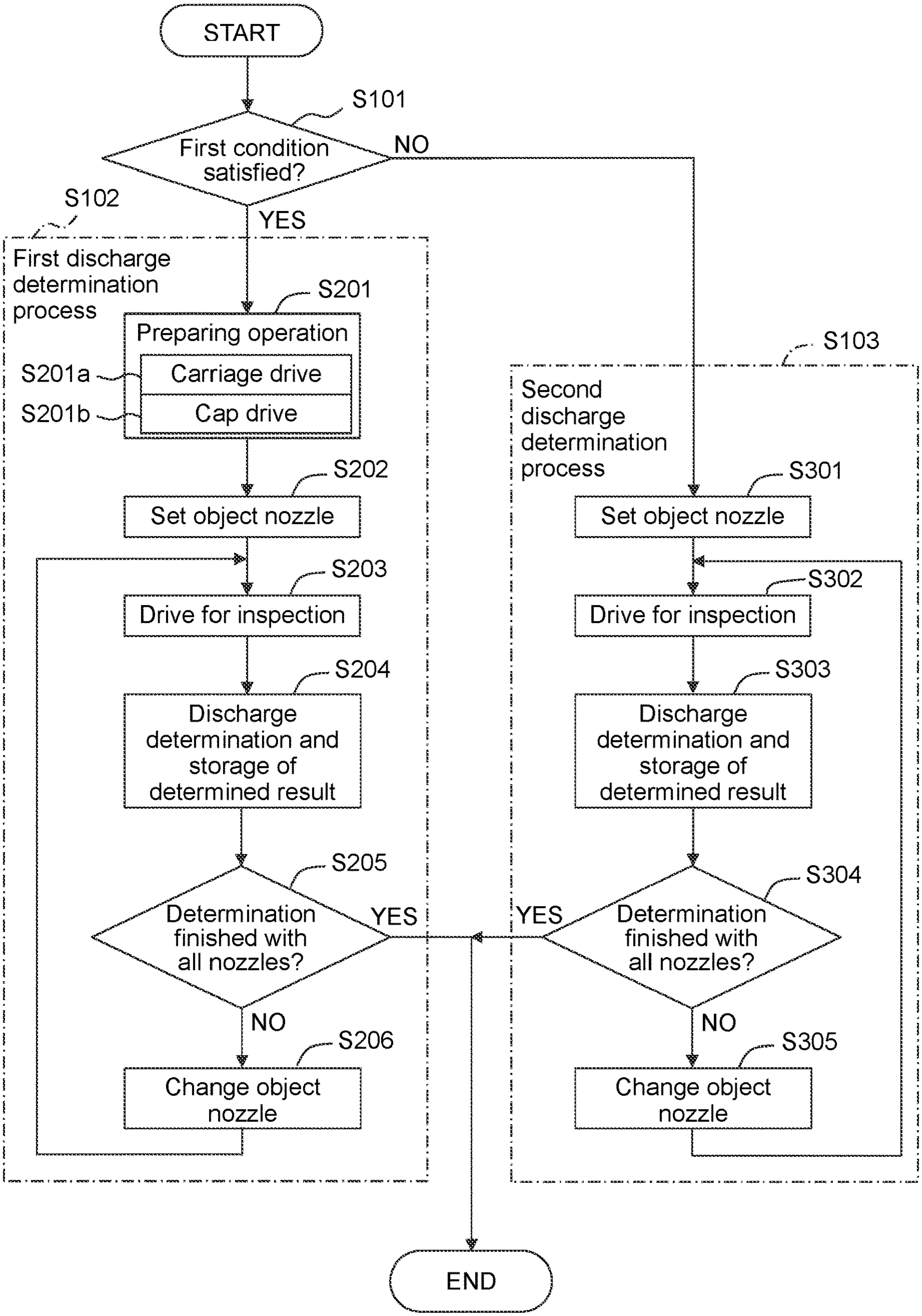
FIG. 5A is a flow chart depicting a processing flow for determining whether or not the ink is discharged normally from the nozzles.

The flow of FIG. 5A starts at the time when the user operates on the operation unit 68 to request for carrying out an inspection of whether or not the ink is discharged normally from the nozzles 10, and the controller 80 receives a signal according to the operation from the operation unit 68. Alternatively, the controller 80 automatically starts the process of the flow of FIG. 5A on the basis of such automatic processing information related to automatically performing the discharge determination process as stored in the flash memory 84.

For example, in the printer 1, the user can operate on the operation unit 68 to let the flash memory 84 store the automatic processing information designating the time for automatically carrying out the discharge determination process. Then, if the flash memory 84 stores the information designating that time, then when receiving the signal indicating the above time from the clock 67, the controller 80 automatically carries out the process following the flow of FIG. 5A. However, the automatic processing information is not limited to the information designating the time for automatically carrying out the discharge determination process, but may be other information than that.

To explain the flow of FIG. 5A in more detail, the controller 80 determines whether or not a first condition, which will be explicated below, is satisfied (S101). If the first condition is satisfied (S101: Yes), then the controller 80 carries out a first discharge determination process as the discharge determination process (S102). If the first condition is not satisfied (S101: No), then the controller 80 carries out a second discharge determination process as the discharge determination process (S103).

<The First Condition>

Hereinbelow, the first condition will be explained. FIG. 5B is a list of the first condition. The information of the first condition is stored in the flash memory 84. In the first embodiment, conditions A1 to A3 are set as the first condition. The condition A1 indicates "First carry out the discharge determination process after the printer 1 is supplied with the power." The condition A2 indicates "Carry out the discharge determination process right before the recording based on the user's recording command, or right after the recording, or during the recording." The condition A3 indicates "Carry out the discharge determination process at a time included in a predetermined time period." Then, the controller 80 determines in the step S101 that the first condition is satisfied if any of the conditions A1 to A3 is satisfied.

In the condition A1, "after the printer 1 is supplied with the power" means, for example, "after the socket 9 is plugged in and the printer 1 is connected to the AC power".

Under the condition A2, for example, if the flash memory 84 stores the information designating the time for automatically carrying out the discharge determination process as the automatic processing information, and if for some reason such as the plug being pulled out of the socket 9 or the like, the printer 1 is not supplied with the power such that the discharge determination process is not carried out automatically at the designated time, then the discharge determination process is carried out by performing the process following the flow of FIG. 5A right before the immediate following recording is carried out on the recording paper P. Further, for example, if the discharge determination process is not carried out at the designated time, and if the immediate following recording is carried out in a high speed mode to perform the recording at a high speed, then the discharge determination process is not carried out right before that recording, but the discharge determination process is carried out by performing the process following the flow of FIG. 5A right after that recording.

Further, for example, suppose that a paper jam happens during a recording on the recording paper P and, then, the user comes to remove the jammed recording paper P. In such a case, before the recording is restarted on the recording paper P, the discharge determination process is carried out by performing the process following the flow of FIG. 5A.

Further, under the condition A3, the predetermined time period refers to such a time period as to have a lower possibility for the user to feel uncomfortable even if some driving noises arise in the carriage motor 86 and the cap motor 88, such as a time period in the daytime or the like on a day, for example.

Further, in the first embodiment, the condition where the first condition is not satisfied corresponds to the "second condition" of the present disclosure. That is, if the second condition is satisfied, then the controller 80 carries out the second discharge determination process as the discharge determination process.

<The First Discharge Determination Process>

In the first discharge determination process of the step S102, the controller 80 carries out a preparing operation (S201) for establishing the aforementioned capped state (letting the carriage 2 into the maintenance position and letting the cap 71 into the capping position). The preparing operation includes a carriage drive (S201*a*) for the carriage moving mechanism 13 to perform by way of driving the carriage motor 86, and a cap drive (S201*b*) for the cap ascending/descending mechanism 74 to perform by way of driving the cap motor 88.

For example, the controller 80 drives the cap ascending/descending mechanism 74 by way of causing the cap motor 88 to operate through a predetermined number of rotations in the same direction as that for the cap ascending/descending mechanism 74 to cause the cap 71 to ascend. By virtue of this, if the cap 71 is in the capping position, then the cap 71 does not move but maintains the state in the capping position. On the other hand, if the cap 71 is positioned below the capping position, then the cap 71 ascends up to the capping position.

Next, the controller 80 drives the carriage moving mechanism 13 by way of causing the carriage motor 86 to operate through another predetermined number of rotations. On this occasion, if the carriage 2 is in the maintenance position, then the cap 71 attaches tightly to the nozzle surface 4*a* while the carriage 2 is restrained from moving in the scanning direction by an unshown carriage locker provided integrally with the cap 71. Therefore, the carriage 2 does not move and the signal outputted from the encoder sensor 32 does not change. On the other hand, if the carriage 2 is in another position than the maintenance position, then the carriage 2 moves in the scanning direction and the signal outputted from the encoder sensor 32 changes. By virtue of this, if there is no change of the output of the encoder sensor 32, then it is possible to confirm that the capped state is established.

On the other hand, if the carriage 2 moves and thus the signal outputted from the encoder sensor 32 changes, then the controller 80 further drives the cap motor 88 to let the cap ascending/descending mechanism 74 cause the cap 71 to descend to an uncapping position and then drives the carriage motor 86 to let the carriage moving mechanism 13 move the carriage 2 up to the maintenance position. Thereafter, by way of driving the cap motor 88, the cap ascending/descending mechanism 74 causes the cap 71 to ascend to the capping position.

Then, after such preparing operation is carried out, the capped state is established. That is, the carriage drive in the preparing operation serves for putting the carriage 2 to the maintenance position. Further, the carriage drive in the preparing operation serves for putting the cap 71 to the capping position.

Next, the controller 80 sets any of the plurality of nozzles 10 of the ink jet head 4 as an object nozzle to be the object of determining whether or not the ink is discharged normally therefrom (S202). Next, the controller 80 carries out the inspection driving, causing the ink jet head 4 to discharge the ink from the object nozzle (S203). Then, when the inspection driving is carried out, the controller 80 determines whether or not the ink is discharged normally from the object nozzle on the basis of the discharge determination signal outputted from the signal processing circuit 78, and lets the flash memory 84 store the information of determined result (S204).

Next, if there is still a nozzle(s) 10 from which whether or not the ink is discharged normally is not yet determined among the plurality of nozzles 10 of the ink jet head 4 (S205: No), then the controller 80 changes the object nozzle to be another nozzle 10 from which whether or not the ink is discharged normally is not yet determined (S206), and returns the process to the step S203. If whether or not the ink is discharged normally from all nozzles 10 is determined (S205: Yes), then the process is ended.

<The Second Discharge Determination Process>

In the second discharge determination process of the step S103, the controller 80 carries out the same process from the steps S301 to S305 as the process from the steps S202 to S206 of the first discharge determination process. That is, in the second discharge determination process, the controller 80 carries out an operation such as the inspection driving and the like for determining whether or not the ink is discharged normally from the nozzles 10, without carrying out the preparing operation (the carriage drive and the cap drive).

Effects

In the first embodiment, when the discharge determination process is carried out, if the first condition is satisfied, then the first discharge determination process is carried out as the discharge determination process to carry out the inspection driving after carrying out the preparing operation including the carriage drive for putting the carriage 2 to the maintenance position. Further, in the first embodiment, when the discharge determination process is carried out, if the first condition is not satisfied, then the second condition is regarded as satisfied such that the second discharge determination process is carried out as the discharge determination process to carry out the inspection driving without carrying out the preparing operation.

In the first discharge determination process, while the carriage drive causes the carriage motor 86 to bring about a driving noise, it is possible to carry out the inspection driving with the carriage 2 being reliably in the maintenance position. On the other hand, in the second discharge determination process, because the inspection driving is carried out without carrying out the preparing operation, the carriage drive does not cause the carriage motor 86 to bring about the driving noise.

Then, if the first condition is set such that the first condition is not satisfied (the second condition is satisfied) under a condition for the user to easily feel uncomfortable with the driving noise of the carriage motor 86, then when the first condition is satisfied, by carrying out the first discharge determination process, it is possible to reliably determine whether or not the ink is discharged normally from the nozzles 10. Further, when the first condition is not satisfied (the second condition is satisfied), by carrying out the second discharge determination process, it is possible to prevent the carriage motor 86 from bringing about the driving noise under the condition for the user to easily feel uncomfortable.

In this context, in the second discharge determination process, the inspection driving is carried out without conforming whether or not the carriage 2 is in the maintenance position. However, right before the discharge determination process is carried out, such a case rarely happens that the carriage 2 in the printer 1 is not in the maintenance position. Therefore, even if the inspection driving is carried out without carrying out the preparing operation, such a case rarely happens that whether or not the ink is discharged normally from the nozzles 10 cannot be determined.

Further, in the second discharge determination process, if the inspection driving is carried out with the carriage 2 in the maintenance position, then the ink discharged from the nozzles 10 due to the inspection driving comes to attach to the platen 5 and the like. However, because there is not so much amount of the ink discharged from the nozzles 10 due to the inspection driving, no serious problems will occur.

Further, after the printer 1 is supplied with the power, when the discharge determination process is carried out for the first time, compared to the discharge determination process carried out later, there is a high possibility for the carriage 2 to be not in the maintenance position.

Accordingly, in the first embodiment, the condition A1 is set as the first condition for carrying out the discharge determination process for the first time after the printer 1 is supplied with the power. By virtue of this, if the discharge determination process is carried out in the situation at a high possibility for the carriage 2 being not in the maintenance position, then it is possible to reliably determine whether or not the ink is discharged normally from the nozzles 10 by way of carrying out the first discharge determination process.

Further, in recording on the recording paper P, the carriage motor 86 brings about the driving noise in a recording path. However, when the recording is performed on the recording paper P on the basis of the user's recording command, the user usually accepts the driving noise of the carriage motor 86 arising in the recording. Therefore, right before the recording, right after the recording, and during the recording, even if the carriage motor 86 brings about the driving noise due to the carriage drive, the user is less likely to feel uncomfortable.

Accordingly, in the first embodiment, the condition A2 is set as the first condition for carrying out the discharge determination process right before the recording, right after the recording, and during the recording, on the basis of the user's recording command. By virtue of this, if the discharge determination process is carried out in the situation where the user is less likely to feel uncomfortable with the driving noise of the carriage motor 86, then it is possible to reliably determine whether or not the ink is discharged normally from the nozzles 10 by way of carrying out the first discharge determination process.

Further, depending on the time period on a day, there is a difference in whether or not the user feels uncomfortable with the driving noise of the carriage motor 86. For example, the user is less likely to feel uncomfortable with the driving noise of the carriage motor 86 in the daytime whereas the user is more likely to feel uncomfortable with the driving noise of the carriage motor 86 at night.

Therefore, in the first embodiment, a condition A3 is set as the first condition for carrying out the discharge determination process at a time included in a predetermined time period being part of a day. Note that on this occasion, if the time for carrying out the discharge determination process is not included in the above predetermined time period of a day, then the first condition is not satisfied. That is, in the first embodiment, the second condition is set for carrying out the discharge determination process at a time not included in the above predetermined time period of a day.

Then, by virtue of this, if the discharge determination process is carried out in a time period when the user is less likely to feel uncomfortable with the driving noise of the carriage motor 86, then by carrying out the first discharge determination process, it is possible to reliably determine whether or not the ink is discharged normally from the nozzles 10. Further, if the discharge determination process is carried out in a time period when the user is more likely to feel uncomfortable with the driving noise of the carriage motor 86, then by carrying out the second discharge determination process, it is possible to prevent the carriage motor 86 from bringing about the driving noise.

Further, in the first embodiment, in the first discharge determination process, by carrying out the inspection driving after carrying out the preparing operation including the cap drive for putting the cap 71 to the capping position, and the carriage drive for putting the carriage 2 to the maintenance position, although the cap motor 88 and the carriage motor 86 still bring about the driving noises, it is possible to carry out the inspection driving in the capped state (with the cap 71 in the capping position and with the carriage 2 in the maintenance position). As a result, it is possible to determine more accurately whether or not the ink is discharged normally from the nozzles 10.

On the other hand, in the second discharge determination process, by carrying out the inspection driving without carrying out the preparing operation (the cap drive and the carriage drive), it is possible to for the user to be less likely to feel uncomfortable by preventing the cap motor 88 and the carriage motor 86 from bringing about the driving noises. On this occasion, in the second discharge determination process, the inspection driving is carried out without confirming whether or not the capped state is established. However, right before the discharge determination process is carried out, because the case that the capped state is not established rarely happens in the printer 1, even if the inspection driving is carried out without carrying out the preparing operation, it rarely happens that whether or not the ink is discharged normally from the nozzles 10 cannot be determined.

Second Embodiment

Next, a second embodiment will be explained. The second embodiment is configured with the same printer 1 as the first embodiment. However, the second embodiment differs from the first embodiment in that the controller 80 carries out the discharge determination process by way of carrying out the process following the flow of FIG. 6.

Figure 6:
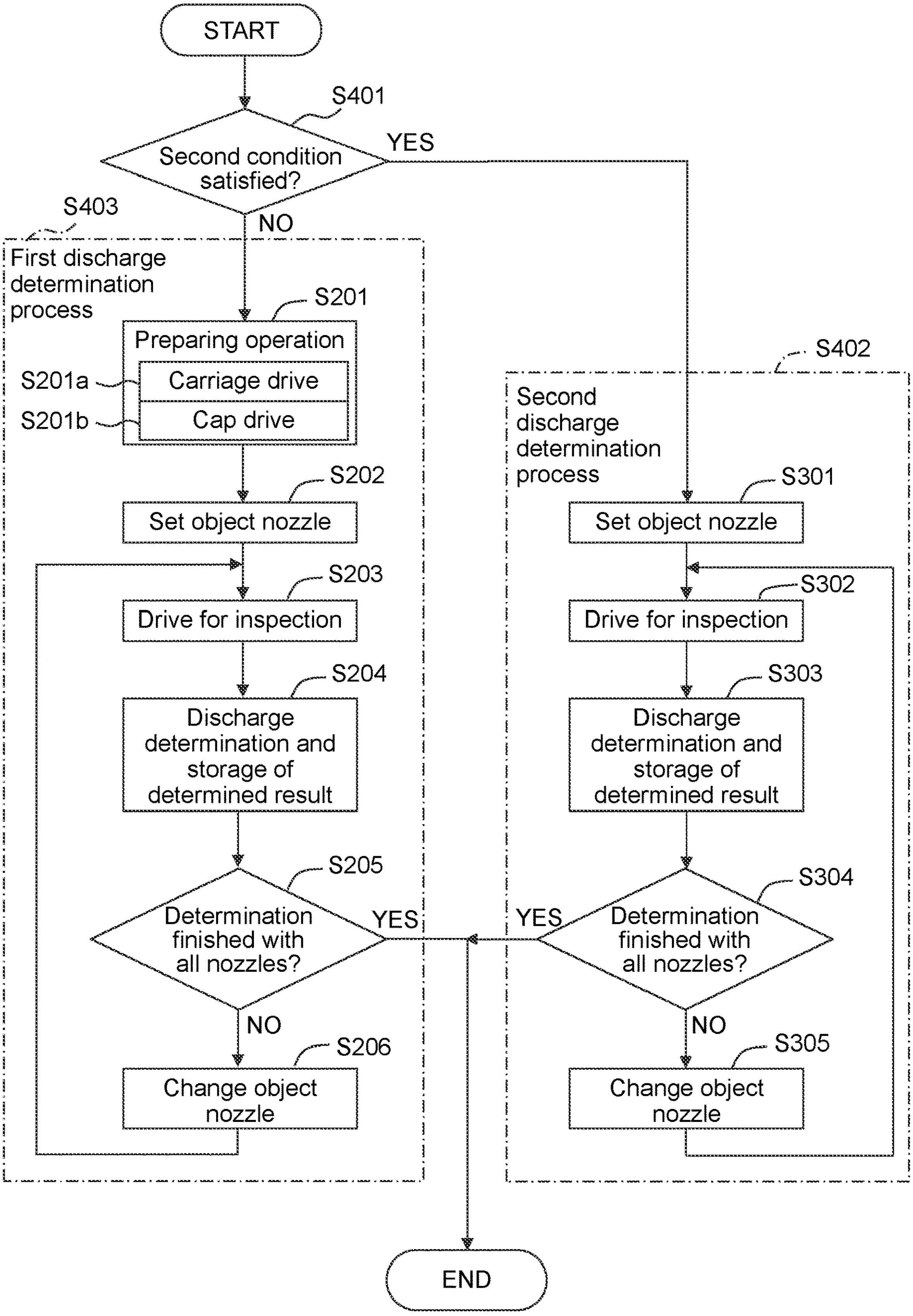
FIG. 6 is a flow chart depicting a processing flow for determining whether or not the ink is discharged normally from the nozzles.

To explain the flow of FIG. 6 in more detail, the controller 80 determines whether or not the aftermentioned second condition is satisfied (S401).

If the second condition is satisfied (S401: Yes), then the controller 80 carries out the second discharge determination process as the discharge determination process (S402). If the second condition is not satisfied (S401: No), then the controller 80 carries out the first discharge determination process as the discharge determination process (S403).

In the second discharge determination process of the step S402, the controller 80 carries out the process of the steps S301 to S305 in the same manner as in the second discharge determination process of the step S103 of the first embodiment. In the first discharge determination process of the step S403, the controller 80 carries out the process of the steps S201 to S206 in the same manner as in the first discharge determination process of the step S102 of the first embodiment.

Further, in the second embodiment, when the printer 1 is recovered from a sleeping state and when the printer 1 has switched from a power on state to a power off state, the controller 80 carries out the process following the flow of FIG. 7A.

In this context, the power off state refers to such a state that the power is stopped from the supply to almost all parts of the printer 1 except the clock 67 and the like. On the other hand, the sleeping state refers to the stop of supplying the power to some of the motors and the like of the printer 1. In the sleeping state, the power consumption is larger than that in the power off state. On the other hand, the time needed for the change from the recovery from the sleeping state to a recordable state on the recording paper P is shorter than the time needed for the change from the switch from the power off state to power on state, to the recordable state on the recording paper P.

To explain the flow of FIG. 7A in more detail, the controller 80 stands by until receiving either a sleep signal requesting the printer 1 to come into the sleeping state or a power off signal requesting the printer 1 to turn off the power (S501: No; S502: No). The sleep signal and the power off signal are sent to, for example, to the controller 80 from the operation unit 68 on the basis of the user's operation on the operation unit 68.

If the sleep signal is received (S501: Yes), then the controller 80 lets the flash memory 84 store confirmation information (the "carriage position information" of the present disclosure) (S503). The confirmation information serves to show whether or not the capped state is established, that is, the carriage 2 is in the maintenance position and the cap 71 is in the capping position.

In the step S503, the controller 80 lets the flash memory 84 store the confirmation information on the basis of the state of the printer 1 when the sleep signal is received. For example, the controller 80 causes the flash memory 84 to store the confirmation information indicating that the capped state is established, if the sleep signal is received with a reliable capped state such as under the condition that the printer 1 stands by without any recording on the recording paper P, and the like. Further, if the sleep signal is received in a state other than the above, then the controller 80 causes the flash memory 84 to store the confirmation information indicating that it is unclear whether or not the capped state is established.

After the flash memory 84 stores the confirmation information in the step S503, the controller 80 carries out a sleep process (S504), and then ends the process. In the sleep process in the step S504, the controller 80 stops the power supply to some of the motors and the like of the printer 1 mentioned earlier on.

If the power off signal is received (S502: Yes), then the controller 80 lets the flash memory 84 store the confirmation information (S505). In the step S505, based on the state of the printer 1 when the power off signal is received, the controller 80 causes the flash memory 84 to store the confirmation information. For example, the controller 80 causes the flash memory 84 to store the confirmation information indicating that the capped state is established, if the power off signal is received with a reliable capped state such as under the condition that the printer 1 stands by without any recording on the recording paper P, and the like. Further, if the power off signal is received in a state other than the above, then the controller 80 causes the flash memory 84 to store the confirmation information indicating that it is unclear whether or not the capped state is established.

After the flash memory 84 stores the confirmation information in the step S505, the controller 80 carries out a power off process (S506), and then ends the process. In the power off process in the step S506, the controller 80 stops the power supply to the other parts of the printer 1 than the clock 67 and the like.

<The Second Condition>

Next, the second condition will be explained. FIG. 7B depicts a list of the second condition. The information of the second condition is stored in the flash memory 84. In the second embodiment, conditions B1 to B3 are set as the second condition. The condition B1 refers to "The discharge determination process is carried out automatically after the printer 1 is recovered from the sleeping state or switched from the power off state to the power on state, and the confirmation information stored in the flash memory 84 indicates that the capped state (the carriage 2 in the maintenance position) is established." The condition B2 refers to "Automatically carry out the discharge determination process at the designated time". The condition B3 refers to "Carry out the discharge determination process at a time not included in a predetermined time period on a day". Then, the controller 80 determines that the second condition is satisfied in the step S401 if any of the conditions B1 to B3 is satisfied.

Further, in the second embodiment, the condition that the second condition is not satisfied corresponds to the "first condition" of the present disclosure. That is, if the first condition is satisfied, then the controller 80 carries out the first discharge determination process as the discharge determination process.

Effects

In the second embodiment, when the discharge determination process is carried out, if the second condition is satisfied, then the second discharge determination process is carried out to carry out the inspection driving without carrying out the preparing operation. Further, in the second embodiment, when the discharge determination process is carried out, if the second condition is not satisfied, then the first condition is regarded as satisfied such that the first discharge determination process is carried out to carry out the inspection driving after carrying out the preparing operation.

By virtue of this, if the second condition is set to be satisfied under the condition that the user is more likely to feel uncomfortable with the driving noise of the carriage motor 86, then when the first condition is satisfied (the second condition is not satisfied), by carrying out the first discharge determination process, it is possible to reliably determine whether or not the ink is discharged normally from the nozzles 10. Further, when the second condition is satisfied, by carrying out the second discharge determination process, it is possible to prevent the carriage motor 86 from bringing about the driving noise under the condition that the user is more likely to feel uncomfortable.

Further, if the discharge determination process is automatically carried out by the controller 80, but is not attendantly carried out on the basis of the user's operation on the operation unit 68, then on driving the carriage motor 86 for the carriage drive, the user is more likely to feel uncomfortable by hearing the driving noise of the carriage motor 86 at a time unexpected by the user.

For example, when the printer 1 is in the sleeping state or when the power to the printer 1 is turned off, the user usually assumes that the printer 1 will not bring about any noise. Therefore, if the discharge determination process is carried out automatically after the printer 1 is recovered from the sleeping state or after the printer 1 is switched from the power off state to the power on state, then on driving the carriage motor 86 for the carriage drive, it is highly possible for the user to feel uncomfortable by hearing the driving noise of the carriage motor 86 at a time unexpected by the user.

On the other hand, when the printer 1 switches to the sleeping state or the power off state, if the capped state is established (the carriage 2 is in the maintenance position), then it is assumed that the nozzles 10 are covered by the cap 71 thereafter even when the printer 1 is recovered from the sleeping state or switched from the power off state to the power on state.

Further, if the discharge determination process is carried out automatically at a designated time, then it is not necessary to carry out the discharge determination process right before the recording on the recording paper P, but it is possible to prevent requiring a long time from receiving the recording command to starting the recording. On the other hand, when the discharge determination process is carried out automatically at a designated time, if the carriage motor 86 brings about the driving noise, then the user may feel uncomfortable depending on the designated time such as the designated time being at midnight or the like. Further, even if it is not at midnight, the user does not necessarily remember the time designated by the printer 1. Therefore, the user may still feel uncomfortable.

In view of those facts, in the second embodiment, right before the printer 1 switches to the sleeping state or the power off state, the storage unit stores the confirmation information indicating whether or not the capped state is established (the carriage 2 is in the maintenance position). Then, the condition B 1 is set as the second condition, which refers to: "The discharge determination process is carried out automatically after the printer 1 is recovered from the sleeping state or switched from the power off state to the power on state, and the confirmation information indicates that the capped state (the carriage 2 in the maintenance position) is established".

By virtue of this, when the discharge determination process is carried out in the case where the user is more likely to feel uncomfortable with the driving noise of the carriage motor 86, if it is assumed that the cap 71 covers the nozzles 10, then by carrying out the second discharge determination process, it is possible to prevent the carriage motor 86 from bringing about the driving noise. On the other hand, if it is not assumed that the cap 71 covers the nozzles 10, then by carrying out the first discharge determination process, it is possible to reliably determine whether or not the ink is discharged normally from the nozzles 10, although the carriage motor 86 brings about the driving noise each time the carriage drive or the cap drive is performed. In view of this feature, it is possible to prevent the carriage motor 86 from bringing about the driving noise as much as possible in the case where the user is more likely to feel uncomfortable with the driving noise of the carriage motor 86.

Further, the condition B2 is set as the second condition to automatically carry out the discharge determination process at the designated time. By virtue of this, if the discharge determination process is automatically carried out in the case where it is highly possible for the user to feel uncomfortable with the driving noise of the carriage motor, then it is possible to carry out the second discharge determination process to prevent the carriage motor from bringing about the driving noise.

Further, in the second embodiment, the condition B3 is set as the second condition to carry out the discharge determination process at a time not included in the predetermined time period on a day. Note that on this occasion, if the time when the discharge determination process is carried out is included in the predetermined time period on a day, then the second condition is not satisfied. That is, in the second embodiment, the condition that the time when the discharge determination process is carried out is included in the predetermined time period on a day is set as the first condition.

By virtue of this, if the discharge determination process is carried out in a time period when the user is less likely to feel uncomfortable with the driving noise of the carriage motor 86, then by carrying out the first discharge determination process, it is possible to reliably determine whether or not the ink is discharged normally from the nozzles 10. Further, by carrying out the second discharge determination process, it is possible to prevent the carriage motor 86 from bringing about the driving noise.

<Modifications>

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

In the first embodiment, the conditions A1 to A3 depicted in FIG. 5B are set as the first condition. However, without being limited to that, just one or two of the conditions A1 to A3 may be set as the first condition.

Alternatively, at least one of the conditions A1 to A3 and at least one of other conditions than those conditions may be set as the first condition. Alternatively, just one of the other conditions may be set as the first condition.

In the second embodiment, the conditions B1 to B3 depicted in FIG. 6 are set as the second condition. However, without being limited to that, just one or two of the conditions B1 to B3 may be set as the second condition.

Alternatively, for example, instead of the condition B1, such a condition may be set as the second condition: "The discharge determination process is carried out automatically after the printer 1 is recovered from the sleeping state or switched from the power off state to the power on state, and the confirmation information stored in the flash memory 84 indicates that the capped state is established", regardless of whether or not the discharge determination process is carried out automatically.

Alternatively, for example, instead of the condition B1, such a condition may be set as the second condition: "The discharge determination process is carried out automatically after the printer 1 is recovered from the sleeping state or switched from the power off state to the power on state." In this case, there is no need for the process of the flash memory 84 storing the confirmation information.

Alternatively, for example, instead of the conditions B2 and B3, such a condition may be set as the second condition: "Carry out the discharge determination process at a designated time, and the designated time is not included in a predetermined time period."

Alternatively, for example, instead of the conditions B1 and B2, such a condition may be set as the second condition that the discharge determination process be carried out automatically on the basis of automatic processing information.

Alternatively, at least one of the conditions mentioned above and at least one of other conditions than those conditions may be set as the second condition. Alternatively, just one of the other conditions may be set as the second condition.

Further, in the first and second embodiments, if the second condition is satisfied, then only the second discharge determination process is carried out regardless of whether or not the capped state is actually established. However, the present disclosure is not limited to that.

Figure 8A:
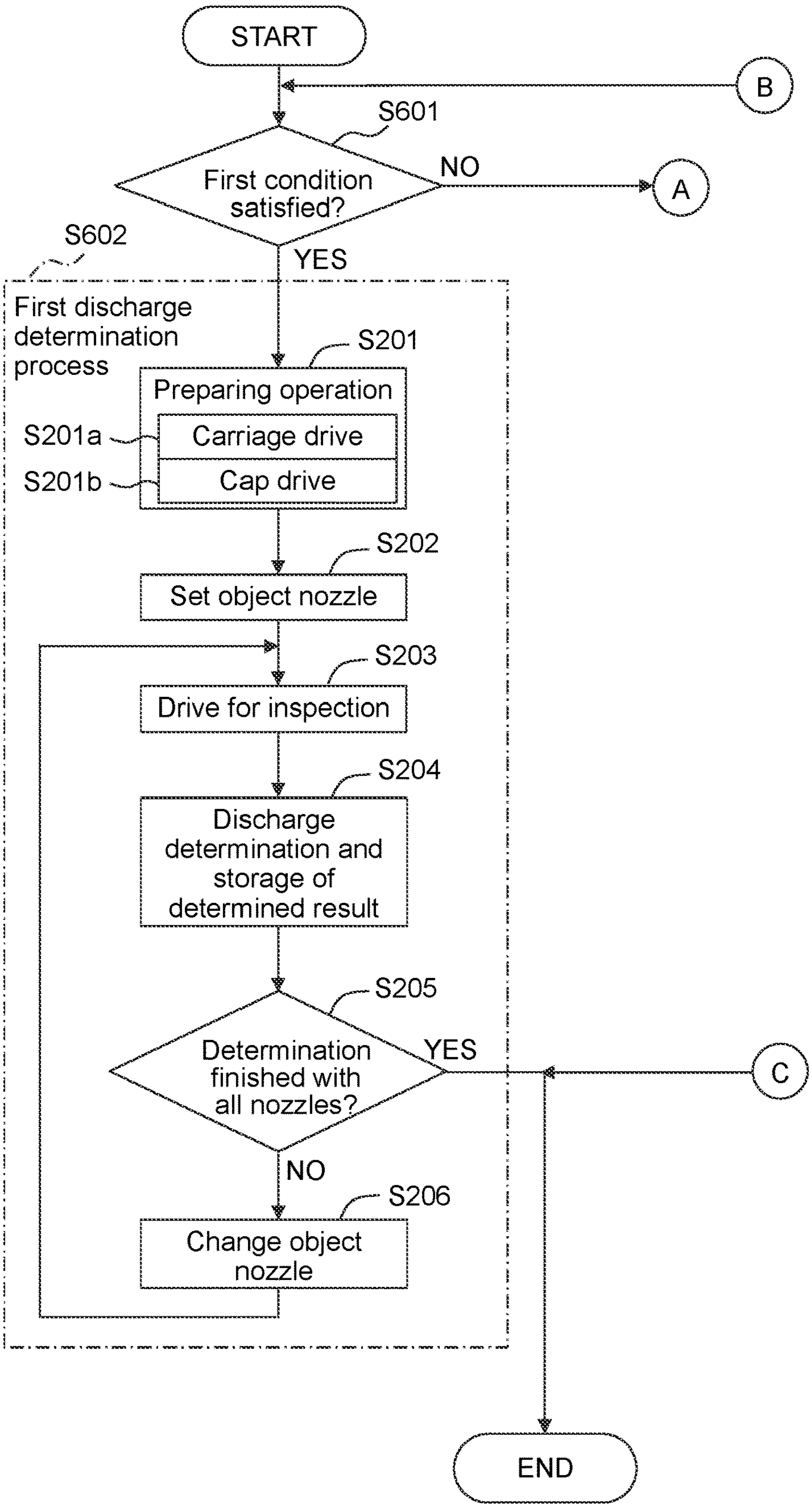
FIGS. 8A and 8B depict a flow chart depicting a processing flow for determining whether or not the ink is discharged normally from the nozzles, with an example of stopping a second discharge determining process when the nozzles are not covered with the cap.
Figure 8B:
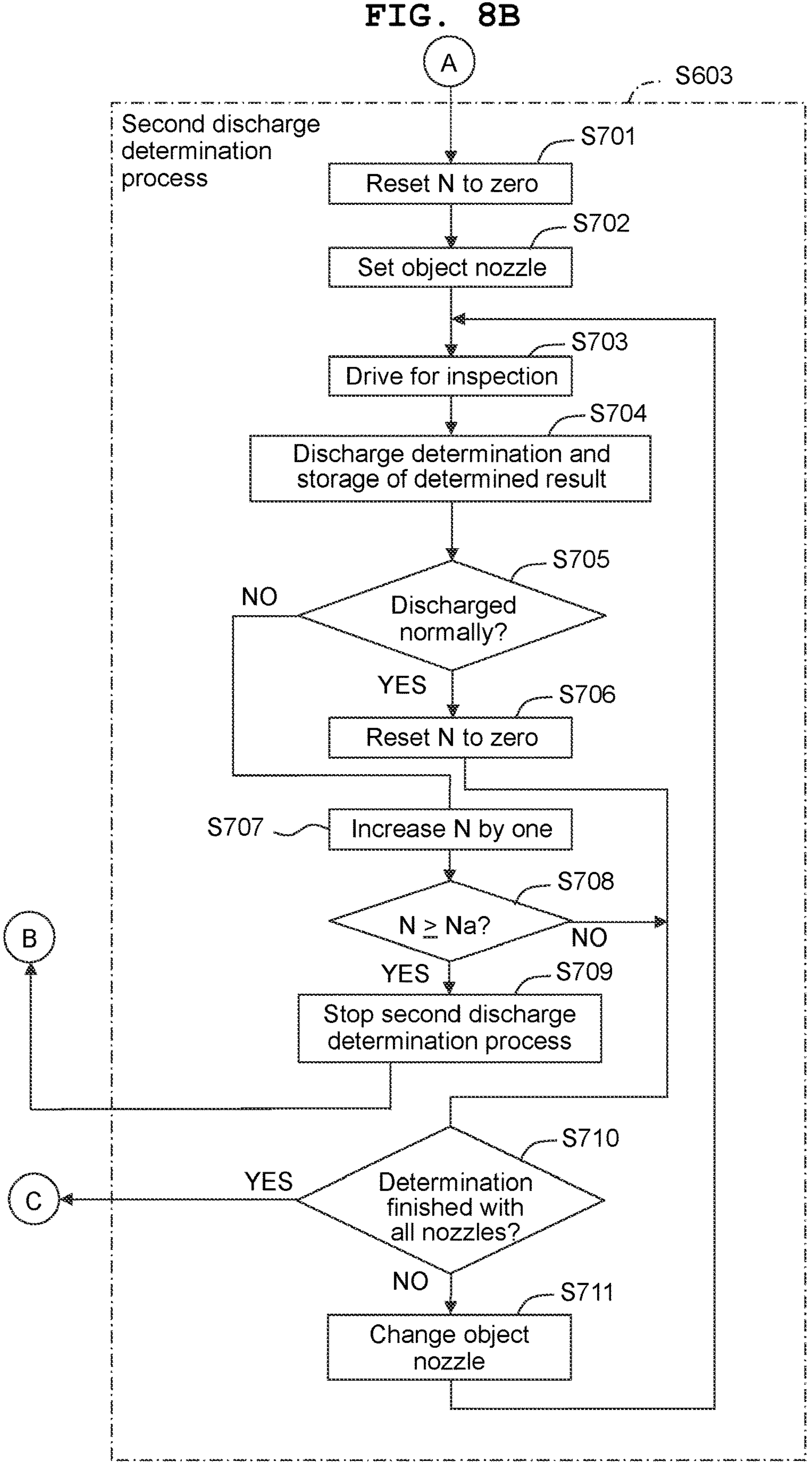

In one modification, the controller 80 carries out the discharge determination process by carrying out the process following the flow of FIGS. 8A and 8B. To explained this in more detail, in this modification, too, in the same manner as in the first embodiment, if the first condition is satisfied (S601: Yes), then the controller 80 carries out the first discharge determination process (S602), whereas if the first condition is not satisfied (S601: No), then the controller 80 carries out the second discharge determination process (S603) regarding the second condition as satisfied.

In the first discharge determination process of the step S602, the controller 80 carries out the process of the steps S201 to 206 in the same manner as the first discharge determination process of the step S102 of the first embodiment.

The second discharge determination process of the step S603 differs from the second discharge determination process of the step S103 of the first embodiment. To explain it in more detail, in the second discharge determination process of the step S603, the controller 80 first resets the value of a variable N to zero (S701). The value of the variable N corresponds to the number of nozzles 10 determined as having not continuously discharged the ink normally in the second discharge determination process.

Next, the controller 80 carries out the same process of the steps S702 to S704 as that of the steps S301 to S303 of the first embodiment. If it is determined that the ink is discharged normally from the nozzles 10 (S705: Yes), then the controller 80 resets the value of the variable N to zero (S706), and then carries out the same process of the steps S710 and S711 as that of the steps S305 and S306 of the first embodiment. Then, the process returns to the step S703 after the object nozzle is changed in the step S711.

If it is determined that the ink is not discharged normally from the nozzles 10 (S705: No), then the controller 80 increases the value of the variable N by one (S707) and then determines whether or not the value of the variable N is equal to or larger than a predetermined value Na (S708). The predetermined value Na is, for example, 30 or so. If the value of the variable N is less than the predetermined value Na (S708: No), then the controller 80 causes the process to proceed to the step S710.

If the value of the variable N is equal to or larger than the predetermined value Na (S708: Yes), then the controller 80 stops the second discharge determination process (S709) and returns the process to the step S601. In the step S709, the controller 80 carries out operations needed to stop the second discharge determination process such as letting the high voltage power circuit 77 cancel the application of voltage to the electrode 76 and the like.

Further, in this modification, as depicted in FIG. 9, a condition A4 is set as the first condition in addition to the conditions A1 to A3 explained in the first embodiment. The condition A4 refers to "The second discharge determination process is stopped." Therefore, when the process returns to the step S601 from the step S709, the first condition is satisfied (S601: Yes), and thus the controller 80 carries out the first discharge determination process (S602).

If the inspection driving is carried out not in the capped state (the carriage 2 is not in the maintenance position), then the discharge determination signal outputted from the signal processing circuit 78 when the inspection driving is performed is bound to show that the ink is not discharged normally from the nozzles 10 regardless of whether or not the ink is discharged normally from the nozzles 10. On the other hand, if the inspection driving is carried out in the capped state, then there is a low possibility of determining that a number of nozzles 10 (for example, 30 or so) have not successively discharged the ink normally.

Therefore, in this context, when the second discharge determination process is carried out, if it is determined that Na (the "predetermined number" of the present disclosure) nozzles 10 have not successively discharged the ink normally, then the capped state is regarded as not established (the carriage 2 is not in the maintenance position) such that the second discharge determination process is stopped. By virtue of this, it is possible to restrain the ink from being consumed needlessly while reducing the influence caused by the ink discharge from the nozzles 10 due to the inspection driving with the carriage 2 in another position than the maintenance position.

Further, in this modification, the condition that the second discharge determination process is stopped is set as the first condition. Therefore, after the second discharge determination process is stopped, the first condition that the second discharge determination process is stopped is regarded as satisfied such that the first discharge determination process is carried out. By virtue of this, although the carriage motor 86 brings about the driving noise due to the carriage drive and the cap drive, it is possible to reliably determine whether or not the ink is discharged normally from the nozzles 10.

In the above modification, after the second discharge determination process is stopped in the step S709, the process returns to the step S601. However, without being limited to that, after the second discharge determination process is stopped, the process may be ended directly.

Further, in the above modification, too, in the same manner as in the second embodiment, if the second condition is satisfied, then the second discharge determination process may be carried out like the step S603, whereas if the second condition is not satisfied, then the first condition is regarded as satisfied such that the first discharge determination process may be carried out like the step S602. However, in this case, after the second discharge determination process is stopped in the step S709, the process shall proceed directly to the first discharge determination process.

Further, in the first embodiment, in the first embodiment, the first condition is set and if the first condition is satisfied, then the first discharge determination process is carried out, whereas if the first condition is not satisfied, then the second condition is regarded as satisfied such that the second discharge determination process is carried out. On the other hand, in the second embodiment, the second condition is set and if the second condition is satisfied, then the second discharge determination process is carried out, whereas if the second condition is not satisfied then the first condition is regarded as satisfied such that the first discharge determination process is carried out. However, the present disclosure is not limited to that.

For example, the first condition and the second condition may be set as are never satisfied at the same time. If the first condition is satisfied then the first discharge determination process is carried out whereas if the second condition is satisfied then the second discharge determination process is carried out. If neither the first condition nor the second condition is satisfied, then another process may be carried out.

Further, in the first and second embodiments, the preparing operation includes the carriage drive for the carriage moving mechanism 13 to carry out by way of driving the carriage motor 86, and the cap drive for the cap ascending/descending mechanism 74 to carry out by way of driving the cap motor 88. However, the present disclosure is not limited to that.

For example, if the printer is provided with a sensor capable of detecting whether or not the cap 71 is in the capping position, then based on a signal from the sensor, it is possible to determine whether or not the cap 71 is in the capping position. In this case, in the preparing operation, based on the signal from the above sensor, if the cap 71 is determined as in the capping position, then the carriage drive may be performed and whether or not the carriage 2 is in the maintenance position may be determined on the basis of the signal from the encoder sensor 32. In this case, in the preparing operation, while the carriage motor 86 is driven, the cap motor 88 is not driven. That is, by performing the carriage drive without performing the cap drive, it is possible to confirm whether or not the nozzles 10 are covered by the cap 71.

However, in this case, too, if the cap 71 is determined as not in the capping position on the basis of the signal from the sensor, or if the carriage 2 is determined as not in the maintenance position on basis of the carriage drive, then in the same manner as explained in the first embodiment, it is necessary to perform the carriage drive and the cap drive.

Alternatively, for example, the printer may not be provided with a cap motor, and the cap ascending/descending mechanism 74 may cause the cap 71 to ascend along with the motion of the carriage 2 when the carriage 2 is approaching the maintenance position and cause the cap 71 descend along with the motion of the carriage 2 when the carriage 2 is departing from the maintenance position. Then, the preparing operation is to include the carriage drive only for driving the carriage motor 86.

Further, in the first and second embodiments, the user operates on the operation unit 68 to request the printer 1 to record on the recording paper P. However, without being limited to that, for example, the user may operate on a PC connected to the printer to request the printer 1 to record on the recording paper P. Note that on this occasion, the printer receives the recording command from the PC in a connecting part of the printer with the PC. That is, the connecting part of the printer with the PC corresponds to the "requesting signal receiver" of the present disclosure. Further, the user may operate on the PC to request for carrying out an inspection of whether or not the ink is discharged normally from the nozzles 10.

Further, in the first and second embodiments, whether or not the ink is discharged normally from the nozzles 10 is determined on the basis of the discharge determination signal outputted from the signal processing circuit 78 according to the change of voltage in the electrode 76 arranged inside the cap 71 from the nozzle 10 when the ink jet head 4 is caused to carry out the inspection driving. However, the present disclosure is not limited to that.

For example, instead of the electrode 76, such an electrode may be provided as extending in the vertical direction to face a space below the nozzle 10 with the carriage 2 in the maintenance position. Then, the signal (the "discharge determination signal" of the present disclosure) may be outputted from the signal processing circuit 78, according to the change of the voltage of the above electrode when the inspection driving is performed with the carriage 2 in the maintenance position. Note that in this case, the combination of the electrode extending in the vertical direction, the high voltage power circuit 77, the signal processing circuit 78, and the resistor 79 corresponds to the "discharge determination signal output unit" of the present disclosure.

Alternatively, for example, an optical sensor (the "discharge determination signal output unit" of the present disclosure) may be provided to directly detect the ink discharged from the nozzles 10 with the carriage 2 in a predetermined position such as the maintenance position or the like, and output a signal (the "discharge determination signal" of the present disclosure) according to the detected result. Then, whether or not the ink is discharged normally from the nozzles 10 may be determined on the basis of the signal outputted from the optical sensor.

Alternatively, for example, in the same manner as is set forth in Japanese Patent No. 4929699, a voltage detection circuit (the "discharge determination signal output unit" of the present disclosure) is connected to the plate formed therein with the nozzles of the ink jet head, so as to detect the change of the voltage when the ink is discharged from the nozzles. Therefore, whether or not whether or not the ink is discharged normally from the nozzles 10 may be determined on the basis of the signal (the "discharge determination signal" of the present disclosure) outputted from the voltage detection circuit when the operation is carried out for discharging the ink from the nozzles with the carriage having been moved to a detection position. The contents of Japanese Patent No. 4929699 are incorporated herein.

Further, in the first and second embodiments, the inspection driving is performed to determine whether or not the ink is discharged normally from the nozzles 10 for all nozzles 10 of the ink jet head 4. However, without being limited to that, for example, the inspection driving may be performed to determine whether or not the ink is discharged normally from the nozzles 10 for some certain nozzles 10 of the ink jet head 4 such as for every other nozzle 10 in each nozzle array 19 or the like. Then, for the other nozzles 10, whether or not the ink is discharged normally from the nozzles 10 may be assumed on the basis of the determined result for those certain nozzles 10.

Further, in the above example, the discharge determination signal outputted from the signal processing circuit 78 accords to whether or not the ink is discharged from the nozzles 10. Then, if the discharge determination signal indicates that the ink is discharged from the nozzles 10, then it is determined that the ink is discharged normally from the nozzles 10. However, without being limited to that, the discharge determination signal may accord to another discharge aspect than whether or not the ink is discharged from the nozzles 10 such as the discharge direction, discharge speed or the like. Then, if the discharge determination signal indicates that the ink is discharged from the nozzles 10 in a predetermined discharge aspect, then it may be determined that the ink is discharged normally from the nozzles 10.

Further, the above explanation was made with an example of applying the present disclosure to a printer provided with a so-called serial head which discharges the ink from a plurality of nozzles while moving together with the carriage in the scanning direction. However, without being limited to that, for example, it is possible to apply the present disclosure to printers provided with a so-called line head which extends in the scanning direction through the entire length of the recording paper.

Further, the above explanation was made with an example of applying the present disclosure to a printer discharging an ink from the nozzles to carry out recording on the recording paper P. However, without being limited to that, the present disclosure may also be applied to printers recording image on recording media other than recording paper such as T-shirts, sheets for outdoor advertising, cases for portable terminals such as smartphones and the like, corrugated cardboards, resin materials, or the like. Further, the present disclosure may also be applied to liquid discharge apparatuses discharging other liquids than ink such as resins or metals in the form of liquid.

What is claimed is:

1. A liquid discharge apparatus comprising:

a liquid discharge head in which a nozzle is opened;

a carriage mounting the liquid discharge head;

a carriage moving mechanism configured to move the carriage;

a carriage motor configured to drive the carriage moving mechanism;

an output unit configured to output a discharge determination signal according to whether or not a liquid is discharged normally from the nozzle by an inspection for discharging the liquid from the nozzle in a case that the inspection is performed with the carriage in a predetermined position; and a controller configured to carry out a determination of whether or not the liquid is discharged normally from the nozzle based on the discharge determination signal output from the output unit in a case that the inspection is performed, wherein in response that a first condition is satisfied, as a first discharge determination process, the controller causes the liquid discharge head to perform the inspection after causing the carriage moving mechanism to move the carriage to the predetermined position, and in response that a second condition which is different from the first condition is satisfied, as a second determination process, the controller causes the liquid discharge head to perform the inspection, without causing the carriage moving mechanism to move the carriage to the predetermined position.

2. The liquid discharge apparatus according to claim 1, wherein the first condition is such that the determination be carried out first after an electric power is supplied to the liquid discharge apparatus.

3. The liquid discharge apparatus according to claim 1, wherein as a discharge operation, the controller causes the carriage moving mechanism to move the carriage while causing the liquid discharge head to discharge the liquid toward a medium from the nozzle, the liquid discharge apparatus further comprises a receiver configured to receive a discharge request signal requesting a user to carry out the discharging operation, and the first condition is such that the determination be carried out at least one of right before the discharging operation, right after the discharging operation, or during the discharging operation, the discharging operation being carried out in response to the discharge request signal received by the receiver.

4. The liquid discharge apparatus according to claim 1, further comprising a memory configured to store automatic processing information related to automatically carrying out the determination, wherein the second condition is such that the controller automatically carry out the determination based on the automatic processing information.

5. The liquid discharge apparatus according to claim 4, wherein the second condition is such that the controller automatically carry out the determination based on the automatic processing information after recovering the liquid discharge apparatus from a sleeping state or switching the liquid discharge apparatus from a power off state to a power on state.

6. The liquid discharge apparatus according to claim 4, wherein the automatic processing information designates a time for automatically carrying out the determination.

7. The liquid discharge apparatus according to claim 1, further comprising a memory, wherein the controller causes the memory to store carriage position information indicating whether or not the carriage is in the predetermined position right before the liquid discharge apparatus switches to a sleeping state or a power off state, and the second condition is such that the controller carry out the determination after recovering the liquid discharge apparatus from the sleeping state or switching the liquid discharge apparatus from the power off state to a power on state, and the carriage position information indicates that the carriage is in the predetermined position.

8. The liquid discharge apparatus according to claim 1, wherein the first condition is such that the determination be carried out at a time included in a predetermined time period being part of a day, and the second condition is such that the determination be carried out at a time not included in the predetermined time period being part of the day.

9. The liquid discharge apparatus according to claim 1, wherein the liquid discharge head includes a plurality of nozzles, in the determination, the controller performs the inspection according to each of the plurality of nozzles and, based on the discharge determination signal outputted from the output unit when the inspection is performed for each nozzle, determines whether or not the liquid is discharged normally from the nozzle under inspection, and in the second discharge determination process, the controller stops carrying out the second discharge determination process in a case that a predetermined number of the nozzles have not successively discharged the liquid normally.

10. The liquid discharge apparatus according to claim 9, wherein the first condition is such that the second discharge determination process is stopped, and after the second discharge determination process is stopped, the controller carries out the first discharge determination process, regarding the first condition as satisfied.

11. The liquid discharge apparatus according to claim 1, further comprising:

a cap configured to cover the nozzle;

a cap moving mechanism configured to move the cap between a capping position for covering the nozzle and an uncapping position away from the liquid discharge head; and a cap motor configured to drive the cap moving mechanism, wherein the output unit includes: an electrode arranged in the cap; and a power supply configured to generate a potential difference between the liquid discharge head and the electrode, the predetermined position is such a position of the carriage that the nozzle faces the cap, the output unit is configured to output, as the discharge determination signal, a signal according to an electrical change, in a state that the liquid discharge head performs the inspection, with the carriage in the predetermined position, with the cap in the capping position, and with the voltage being applied between the liquid discharge head and the electrode by the power supply, in the first discharge determination process, the controller causes the liquid discharge head to perform the inspection, after causing the cap moving mechanism to move the cap to the capping position while causing the carriage moving mechanism to move the carriage to the predetermined position, and in the second discharge determination process, the controller causes the liquid discharge head to perform the inspection, without causing the cap moving mechanism to move the cap to the capping position, and without causing the carriage moving mechanism to move the carriage to the predetermined position.

* * * * *